(12) United States Patent
Tayebati et al.

(10) Patent No.: US 9,104,029 B2
(45) Date of Patent: Aug. 11, 2015

(54) MULTI-WAVELENGTH BEAM COMBINING SYSTEM AND METHOD

(71) Applicant: TeraDiode, Inc., Wilmington, MA (US)

(72) Inventors: Parviz Tayebati, Sherborn, MA (US); Bien Chann, Merrimack, NH (US)

(73) Assignee: TeraDiode, Inc., Wilmington, MA (US)

( * ) Notice: Subject to any disclaimer, the term of this patent is extended or adjusted under 35 U.S.C. 154(b) by 38 days.

(21) Appl. No.: 13/686,974

(22) Filed: Nov. 28, 2012

(65) Prior Publication Data

US 2013/0215517 A1 Aug. 22, 2013

Related U.S. Application Data

(60) Provisional application No. 61/601,763, filed on Feb. 22, 2012.

(51) Int. Cl.
*G02B 27/14* (2006.01)
*G02B 27/10* (2006.01)
*G02B 26/02* (2006.01)

(52) U.S. Cl.
CPC ........ *G02B 27/1006* (2013.01); *G02B 27/1073* (2013.01); *G02B 27/1086* (2013.01); *G02B 26/02* (2013.01); *Y10T 29/49895* (2015.01)

(58) Field of Classification Search
CPC ............... G02B 26/02; G02B 27/1006; G02B 27/1073; G02B 27/1086
USPC ................................ 359/634, 618
See application file for complete search history.

(56) References Cited

U.S. PATENT DOCUMENTS

| | | | |
|---|---|---|---|
| 6,044,096 A | 3/2000 | Wolak et al. | |
| 6,192,062 B1 | 2/2001 | Sanchez-Rubio et al. | |
| 6,356,576 B1 | 3/2002 | Smith | |
| 7,286,277 B2 * | 10/2007 | Bloom et al. | 359/279 |
| 8,049,966 B2 | 11/2011 | Chann | |
| 2003/0053066 A1* | 3/2003 | Redner | 356/448 |
| 2004/0095983 A1 | 5/2004 | Whitley | |
| 2004/0174604 A1 | 9/2004 | Brown | |
| 2004/0252744 A1 | 12/2004 | Anikitchev et al. | |
| 2006/0126690 A1 | 6/2006 | Kido et al. | |
| 2007/0002925 A1 | 1/2007 | Zediker | |
| 2010/0110556 A1* | 5/2010 | Chann et al. | 359/619 |

(Continued)

FOREIGN PATENT DOCUMENTS

| | | |
|---|---|---|
| JP | 2007165624 A | 6/2007 |
| WO | 2006/045303 A2 | 5/2006 |
| WO | 2006097531 A1 | 9/2006 |

OTHER PUBLICATIONS

Schreiber P et al: "High-brightness fiber-coupling schemes for diode laser bars", Proceedings of the SPIE—The International Society for Optical Engineering SPIE—The International Society for Optical Engineering USA, vol. 5876, 2005, pp. 587602-1-587-602-10, XP002659944, ISSN: 0277-786X Paragraph 0002; figure 3.

(Continued)

*Primary Examiner* — Scott J Sugarman
*Assistant Examiner* — Vipin Patel
(74) *Attorney, Agent, or Firm* — Morgan, Lewis & Bockius LLP (57) ABSTRACT

A system and method for decreasing the optical pathway length, varying brightness output quality, and stabilizing beams along the non-beam combining dimension in a WBC system.

23 Claims, 13 Drawing Sheets

(56) References Cited

U.S. PATENT DOCUMENTS

2011/0216417 A1* 9/2011 Chann et al. ............... 359/618
2011/0216792 A1 9/2011 Bien et al.
2011/0310921 A1 12/2011 Bien et al.

OTHER PUBLICATIONS

Chann, Bet al. "Frequency Narrowed External Cavity Diode Laser Array Bar" Optics Letters, vol. 25. No. 18 Sep. 15, 2000.

Gopinath, J. T. et al., "1450nm High Brightness Wavelength Beam Combined Diode Laser Array" Optics Express, vol. 16, No. 13, Jun. 23, 2008.

Zhu, H. et al., "Spectrally Narrowed External-Cavity High-Power Stack of Laser Diode Arrays", Optics Letters, vol. 30, No. 11, Jun. 1, 2005.

Augst, Steven J. et al., "Beam Combining of Ytterbium Fiber Amplifiers (Invited)," Journal of Optical Social America B., vol. 24, No. 8, Aug. 2007.

Bates, Harry et al., "Picosecond Pulse Stacking in Calcite," Applied Optics vol. 18, No. 7, Apr. 1, 1979.

Clarkson, W.A. et al., "Two-Mirror Beam-Shaping Technique for High-Power Diode Bars," Optics Letters, vol. 21, No. 6, Mar. 15, 1996.

Dawson, Jay W. et al., "Analysis of the Scalability of Diffraction-Limited Fiber Lasers and Amplifiers to High Average Power," Optics Express, vol. 16, No. 17, Aug. 18, 2008.

Fan, T.Y., "Laser Beam Combining for High-Power, High-Radiance Sources," IEEE Journal of Selected Topics in Quantum Electronics, vol. 11, No. 3, May/Jun. 2005.

Loftus, Thomas H. et al., "Spectrally Beam-Combined Fiber Lasers for High-Average-Power Applications," IEEE Journal of Selected Topics in Quantum Electronics, vol. 13, No. 3, May/Jun. 2007.

\* cited by examiner

MULTI-WAVELENGTH BEAM COMBINING SYSTEM AND METHOD

CROSS-REFERENCE TO RELATED APPLICATIONS

This application claims priority under 35 U.S.C. §119 to the following U.S. Provisional Patent Applications, each of which is hereby incorporated by reference in its entirety: U.S. Ser. No. 61/601,763 filed Feb. 22, 2012.

COPYRIGHT INFORMATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present embodiments relate generally to laser systems and more particularly to wavelength beam combining systems and methods.

2. Description of the Prior Art

Wavelength beam combining (WBC) is a method for scaling the output power and brightness from laser diode bars, stacks of diode bars, as well as other lasers arranged in one or two-dimensional array.

WBC methods have been developed to combine beams along the slow dimension of each emitter as well as the fast dimension of each emitter. See for example, U.S. Pat. Nos. 6,192,062, 6,208,679 and 2010/0110556 A1. However, a system architecture having a smaller footprint, spatial combining along the non beam combining dimension and variable/tunable brightness output is desired.

The following application seeks to solve the problems stated.

SUMMARY OF THE INVENTION

A wavelength beam combining system comprising a plurality of emitters, such as a diode bar(s), are combined using a dispersive element to form a multi-wavelength beam. Each emitter in the system individually resonates, and is stabilized through wavelength specific feedback from a common partially reflecting output coupler that is filtered by the dispersive element along a beam combining dimension. Thus, producing a high brightness, power, and efficient multi-wavelength beam combining system.

DETAILED DESCRIPTION OF THE PREFERRED EMBODIMENT

Aspects and embodiments relate generally to the field of scaling laser sources to high-power and high-brightness using wavelength beam combining techniques. More particularly, methods for increasing brightness, stability, and effectiveness of wavelength beam combining systems.

Embodiments described herein include addressing: 1) reducing the footprint of the WBC system; 2) increasing output power through adding an optical spatial beam combining system; and 3) an adjustable brightness output configuration. Through the various embodiments and techniques described herein a reduced-size, stabilized, variable brightness multi-wavelength output laser system may be achieved.

The approaches and embodiments described herein may apply to one and two-dimensional beam combining systems along the slow-axis, fast-axis, or other beam combining dimension. In addition, the techniques may apply to external and non-external (described below) cavity WBC systems.

For purposes of this application optical elements may refer to any of lenses, mirrors, prisms and the like which redirect, reflect, bend, or in any other manner optically manipulate electromagnetic radiation. Additionally, the term beam includes electromagnetic radiation. Beam emitters include any electromagnetic beam-generating device such as semiconductor elements, which generate an electromagnetic beam, but may or may not be self-resonating. These also include fiber lasers, disk lasers, non-solid state lasers and so forth. Generally each emitter is comprised of a back reflective surface, at least one optical gain medium, and a front reflective surface. The optical gain medium refers to increasing the gain of electromagnetic radiation and is not limited to visual, IR or ultraviolet portions of the electromagnetic spectrum. An emitter, may be comprised of multiple beam emitters such as a diode bar configured to emit multiple beams.

Non-Confocal WBC Systems

Figure 1A:
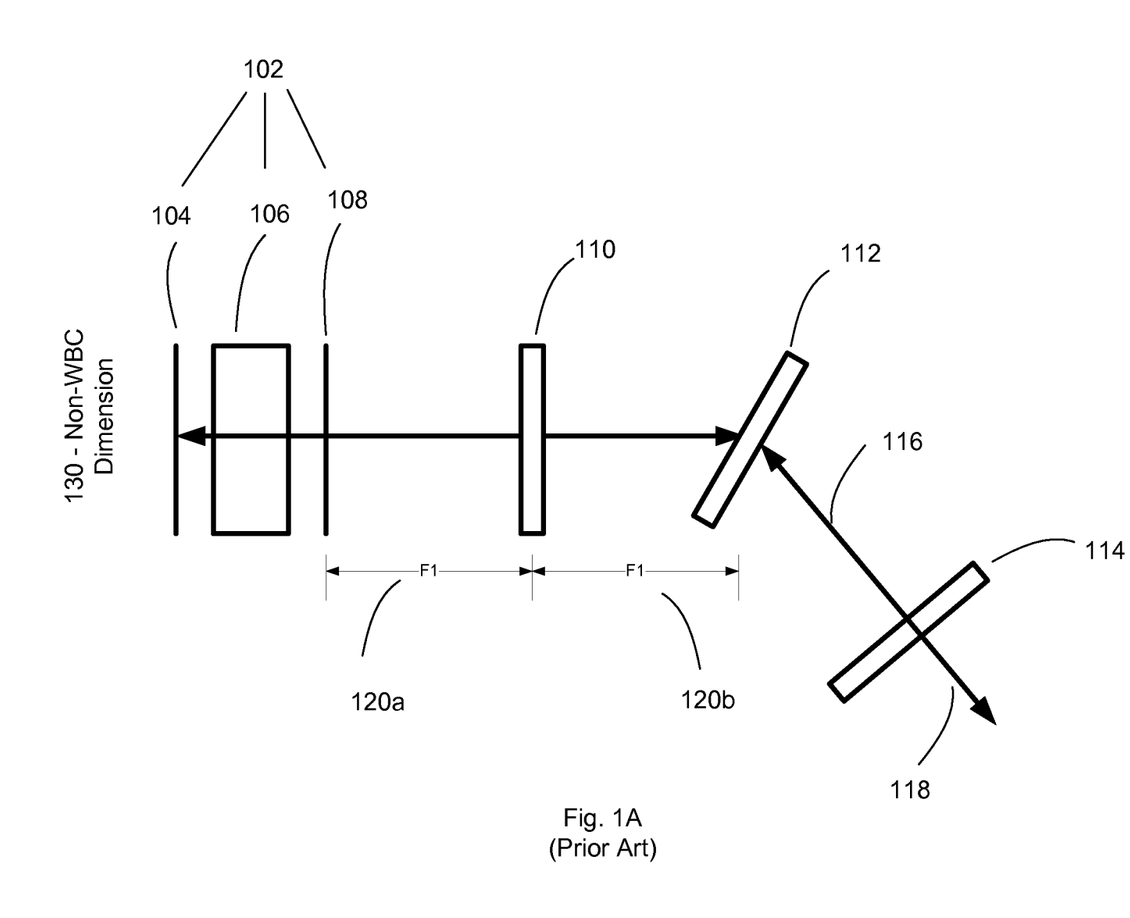
FIGS. 1A-B illustrate the beam combining and non beam combining schematics of previous WBC systems.
Figure 1B:
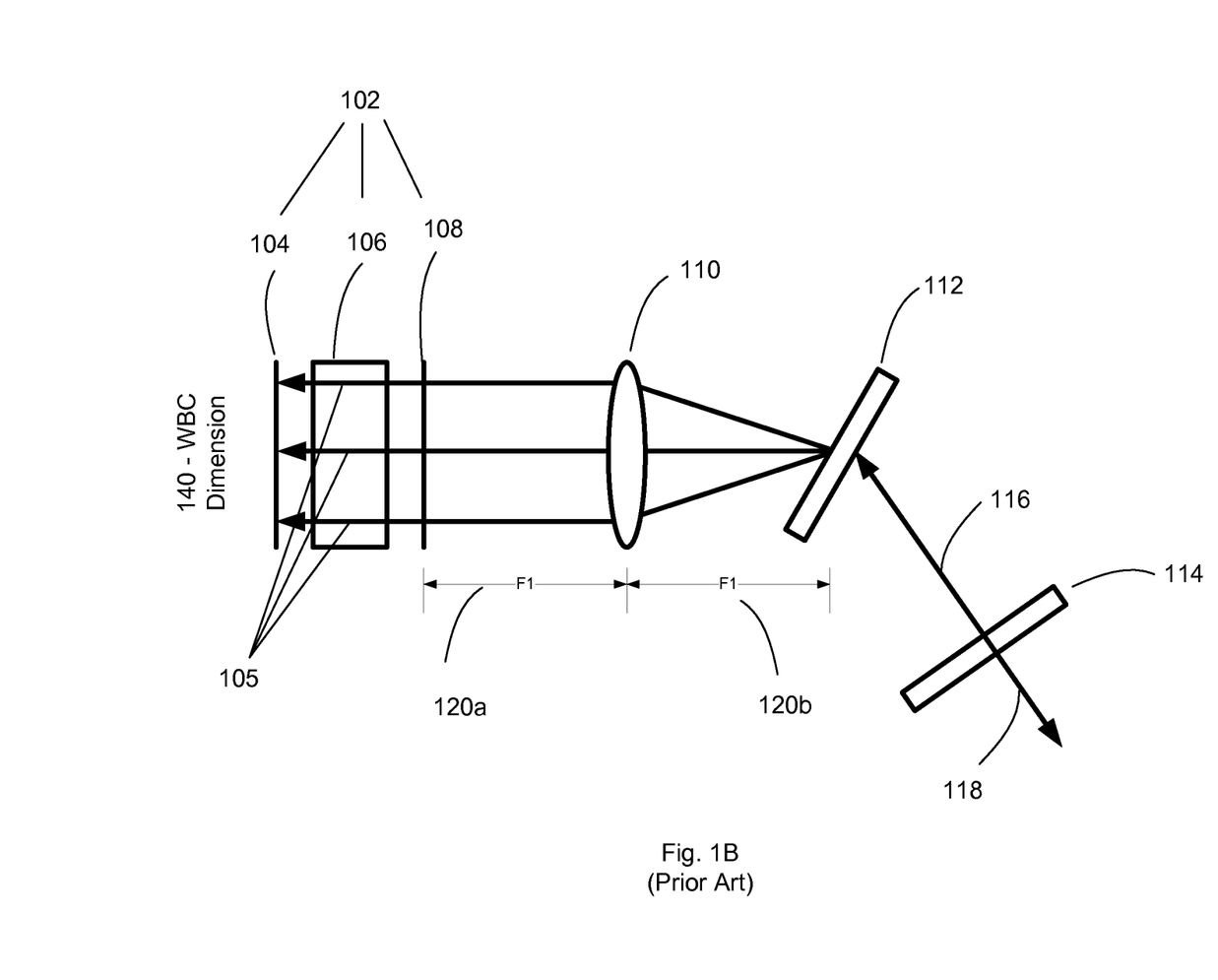

Previous external-cavity one-dimensional (1-D) wavelength beam combining (WBC) systems have consisted of a one-dimensional diode bar 102 having a back reflective surface 104, a gain medium 106 with two or more diode emitters 105, a front reflective surface 108, a combining optic 110, a dispersive element 112, and a partially reflecting output coupler 114. The combining optic or lens 110 is placed a focal distance 120a away from the front reflective surface 108 of the diode bar 102 while on the back plane or other side of 110 dispersive element 112 is placed a focal distance 120b away. The output coupler is placed a certain distance from the dispersive element 112 and reflects a portion of the generated beams(feedback) 116 to the dispersive element 112.

The placement of the combining lens 110 is done to accomplish two functions: The first function is to overlap all the chief rays from all the diode elements onto the dispersive element 112. The second function is to collimate each beam in both axes. See FIGS. 1A-B for a schematic view of the non-beam combining dimension view (FIG. 1A) and the beam combining dimension view (FIG. 1B). Diode bar 102 is comprised of a plurality of emitters (diode emitters) 105, a back reflecting surface 104, gain medium 106, and a front surface/facet 108.

Figure 2A:
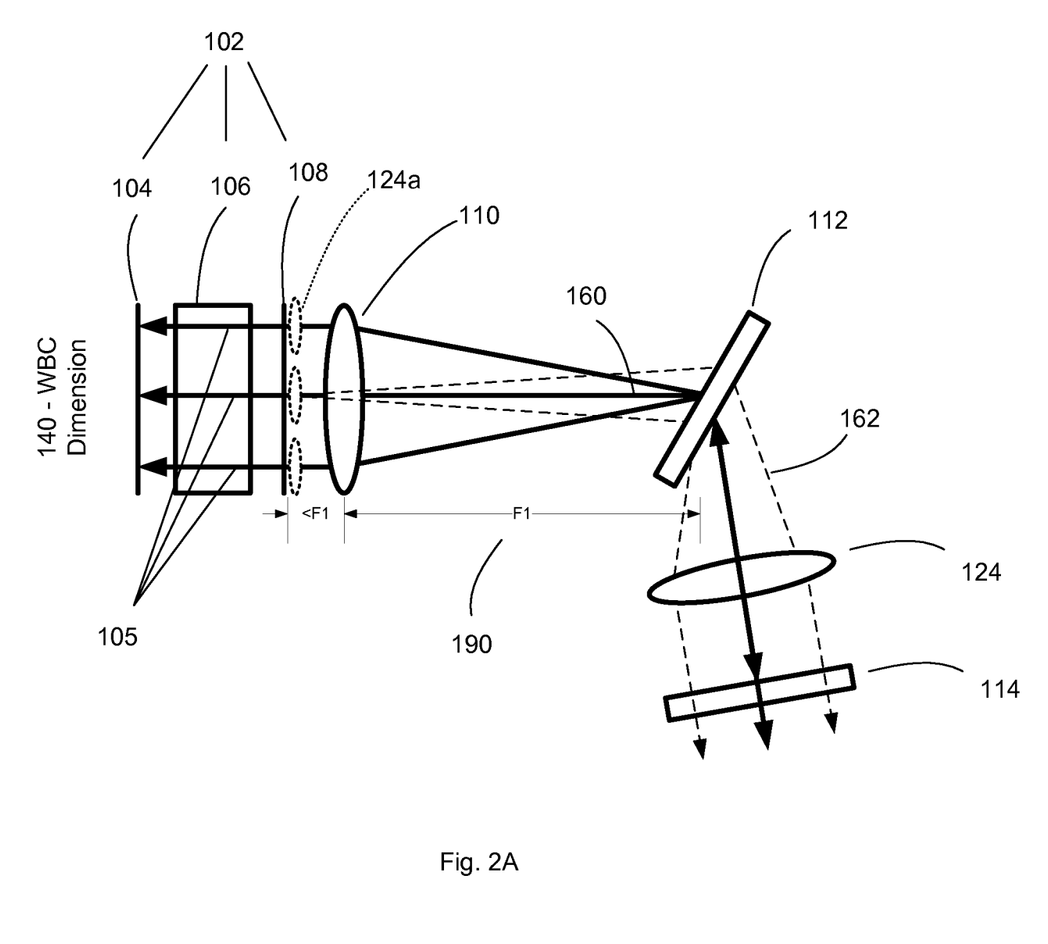
FIGS. 2A-B illustrate shortened WBC systems with non-confocal combining optics.
Figure 2B:
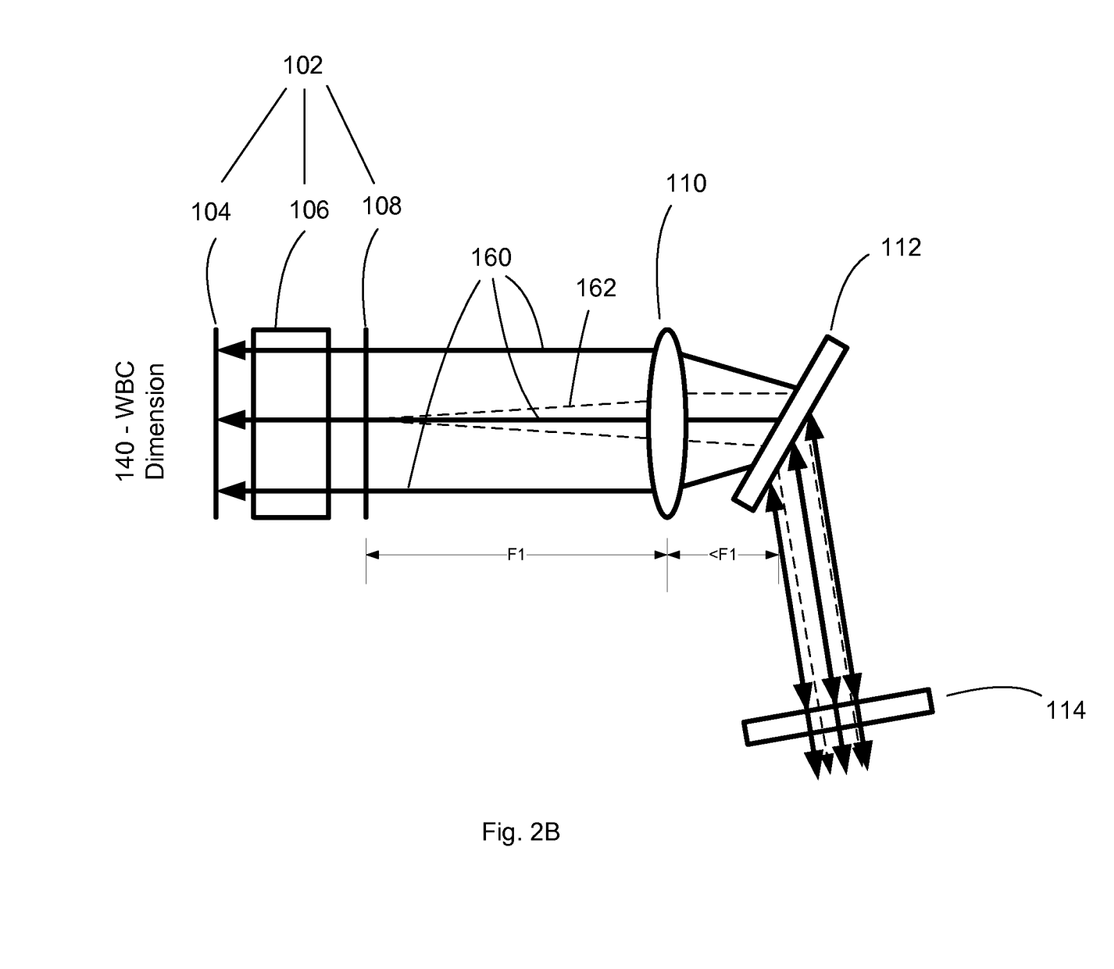

However, a more compact WBC system may be achieved, such as those shown in FIGS. 2A-B by intentionally placing the diode bar 102 or dispersive optic 112 at a position other than the focal plane of the combining optical element 110. If the combining optical element 110 is placed less than a focal length from the diode bar 102, than an additional collimating optic(s) 124 may be placed before or after the dispersive element 112 and before the partially reflective output coupler 114 as shown in FIG. 2A. This allows the optical path length between the laser bar and output coupler to be reduced by almost a full focal length of combining element 110, and particularly, when combining element 110 is placed adjacent to the front surface/facet 108 of diode bar 102.

In a variation of this embodiment, collimating optic(s) 124a may be individually placed in front of each emission point along the front surface/facet of the diode bar and before the combining optical element 110, which still results in a shortened WBC system. In this variation, the collimating optic(s) 124a may be comprised of an array of micro-optical fast-axis collimating (FAC) lenses, slow-axis collimating lenses (SAC) or combination of both. By collimating each beam it provides in part proper wavelength stabilization feedback is received into each of the diode elements. This helps each diode element produce a unique wavelength that is stabilized and less susceptible to shifting, wherein a multi-wavelength output beam profile of high brightness and power is achieved.

As shown in FIG. 2A, the dispersive element or diffraction grating is placed substantially at the back focal plane of the lens. As drawn, the first approximation, the lens with focal length F1 190 only converges the chief rays for each of the diode elements. This can be understood from the Gaussian beam transformation by a lens equation:

$$1/(s+zr^2/(s-f))+1/s''=1/f$$

s and s'' are the input and output waist locations, zr is the Raleigh range, and f is the focal length. Thus, the chief rays 160 are overlapping at the grating while each beam is still diverging 161 (shown dashed). The diverging beams may or may not be later collimated by an optical element, such as 124. With all the diode element beams overlapped on the dispersive element 112, the output beam quality, is generally that of a single emitter. Again, one advantage of this system is the size may be considerably smaller as opposed to a 2× focal length spacing between diode elements and the dispersive element. In some instances cases, the beam path is reduced by almost half or more. The spacing as described herein may be slightly longer, equal to, or slightly shorter than F1.

Alternatively, an embodiment devoid of collimating optic(s) 124 is illustrated in FIG. 2B. Combining optical element 110 is placed a focal length from the front facet 108 and as a result collimates the light from each diode element. A reduced system size is still achieved by placing dispersive element 112 less than a focal length from combining optical element 110. The brightness of the multi-wavelength beam is still increased as compared to the initial array of beams produced by diode bar 102.

As shown in FIG. 2B, the dispersive element 112, is placed much closer than the back focal plane. Again, the penalty of such a system is there is some degradation in the output beam quality. To further illustrate, in one variation of this embodiment, it is assumed that the diode elements 102 are a single 10-mm wide bar with 47 emitters. Each emitter may have a FAC lens (not shown) and no SAC lens. Inclusion of a SAC lens does not change the results here. The focal length of the FAC lens in this variation is 910 µm. In this variation the diode bar is operating at a 1 µm wavelength. With each beam being diffraction limited along the fast axis, the typical full divergence after the FAC lens is about 1 milliradian (mrd). Along the slow-axis the beam is diverging about 100 mrd. We assume that the combining optical element 110 or transform lens has a focal length of 150 mm. The output beam quality is approximately:

$$M2=(\theta*\pi/(4*\lambda))*sqrt((z*x/f)^2+1)$$

Where $\lambda=1$ µm, z is the distance after the lens to the grating and center at the back focal plane, x=10 mm is the dimension of the array, and $\theta$ is the individual beam divergence after the grating.

Figure 6:
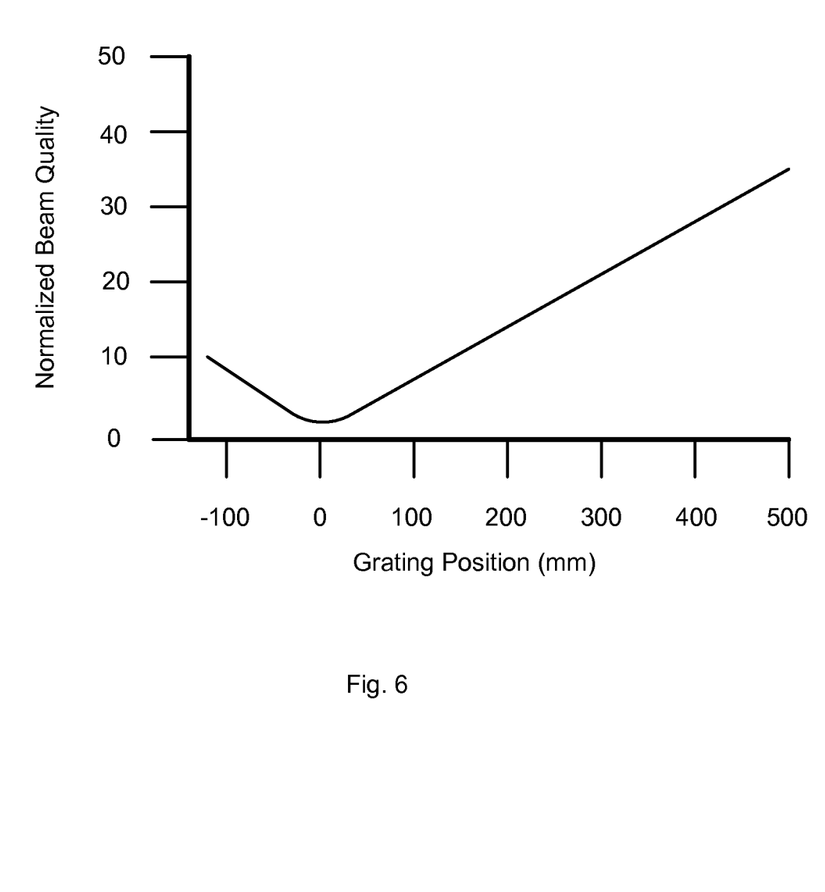
FIG. 6 is a graph showing normalized beam quality based on grating position in a non-confocal WBC system.

FIG. 6 is a graph illustrating the approximate output beam quality as a function of grating position. It is normalized to the ideal case where the grating is at the back focal plane of the optics. As expected at z=0 or the back focal plane the normalized beam quality is 1 and grows to about 33 times at z=500. The normalized free-running beam quality is about M2~47/ff=47/0.5=94, where if is the near field fill-factor of the diode emitter. Thus, even at z=500, the beam quality of the system is still better than free a running system, one without WBC, by about 3 times. In FIGS. 1A-B the combining element 110 also acted as the collimating element. In FIG. 2A the function of the combining element 110 is primarily to focus the chief rays 160 onto the dispersive element 112 and an additional collimating element 124 is placed after the dispersive element 112 generally at the focal plane of 124 to collimated the diverging rays 162. In FIG. 2B combining element 110 is placed at approximately a focal length from the front aperture 108 and now collimates the diverging rays, but because of the shortened focal distance F1 from combining element 110 to dispersive element 112, the chief rays do not completely overlap onto each other as in previous WBC embodiments. The multi-beam output still has an increase in brightness, but as suggested by FIG. 6 is not at optimal brightness.

Figure 2C:
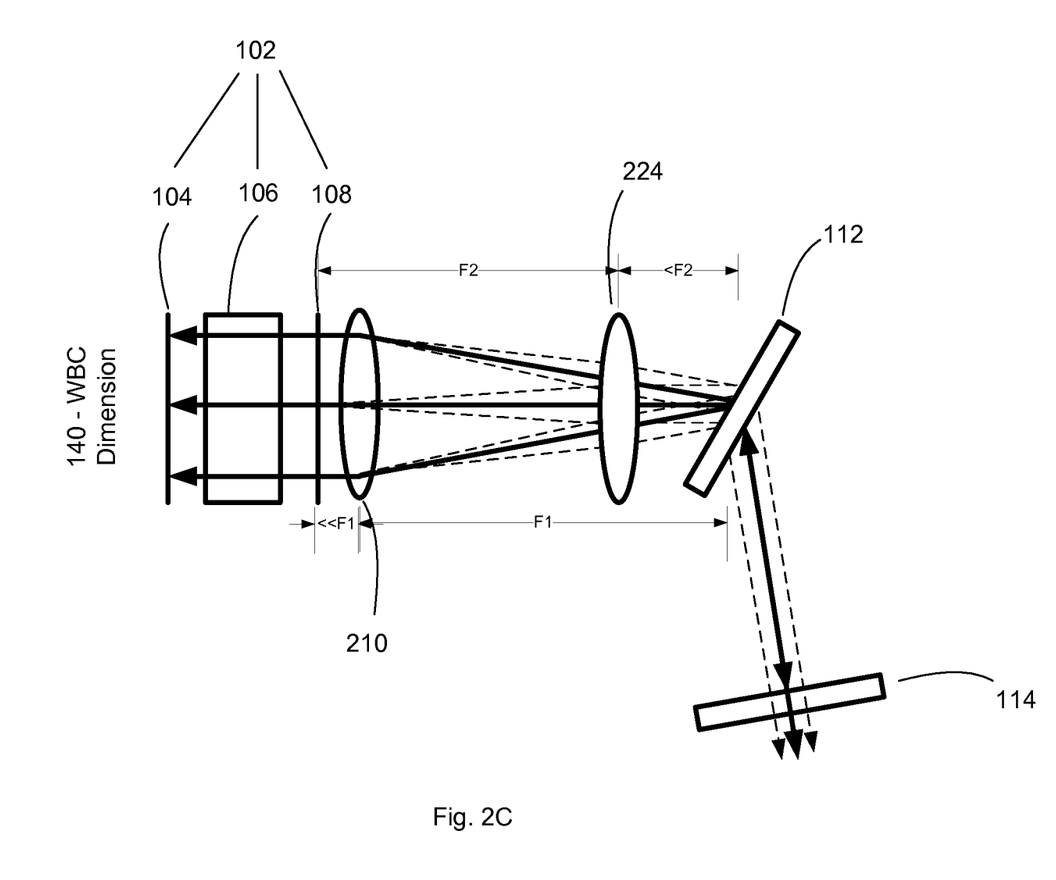
FIG. 2C illustrates a compact non-confocal dual lens WBC system.

FIG. 2C illustrates a WBC system that enables a shortened beam pathway, substantially separates the functionality of combining chief rays and collimating diverging rays into two separate optical elements (or systems) positioned before the dispersive element. Combining element 210 is positioned at a distance substantially less than its respective focal length F1 away from the front aperture 108 on one side and approximately a focal length F1 away from the dispersive element 112 on the other side. This allows combining element 210 to direct the chief rays from each diode emitter of diode bar 102 to overlap or substantially overlap on the dispersive element 112. At the same time, collimating optical element 224 is placed approximately a focal distance F2 away from the front aperture of each diode emitter on one side and at a distance less than focal length F2 from the dispersive element on the other side. Similarly, the primary function of the collimating optical element 224 is to collimate the diverging rays. One skilled in the art will readily acknowledge that both 210 and 224 have optical power along the same dimension and as a result will have some effect on the actual placement of each optical element with respect to the front aperture and dispersive element. However, this interdependency is managed in-part by the placement of each optical element substantially close to the front aperture on one side and the dispersive element on the other side. Thus, the combining optical element 210 primarily dominates the combining of the chief rays on the dispersive element 112, but is influenced by the prescription of collimating optical element 224 and vice versa.

WBC Systems Devoid of an Optical Combining Element

Figure 3:
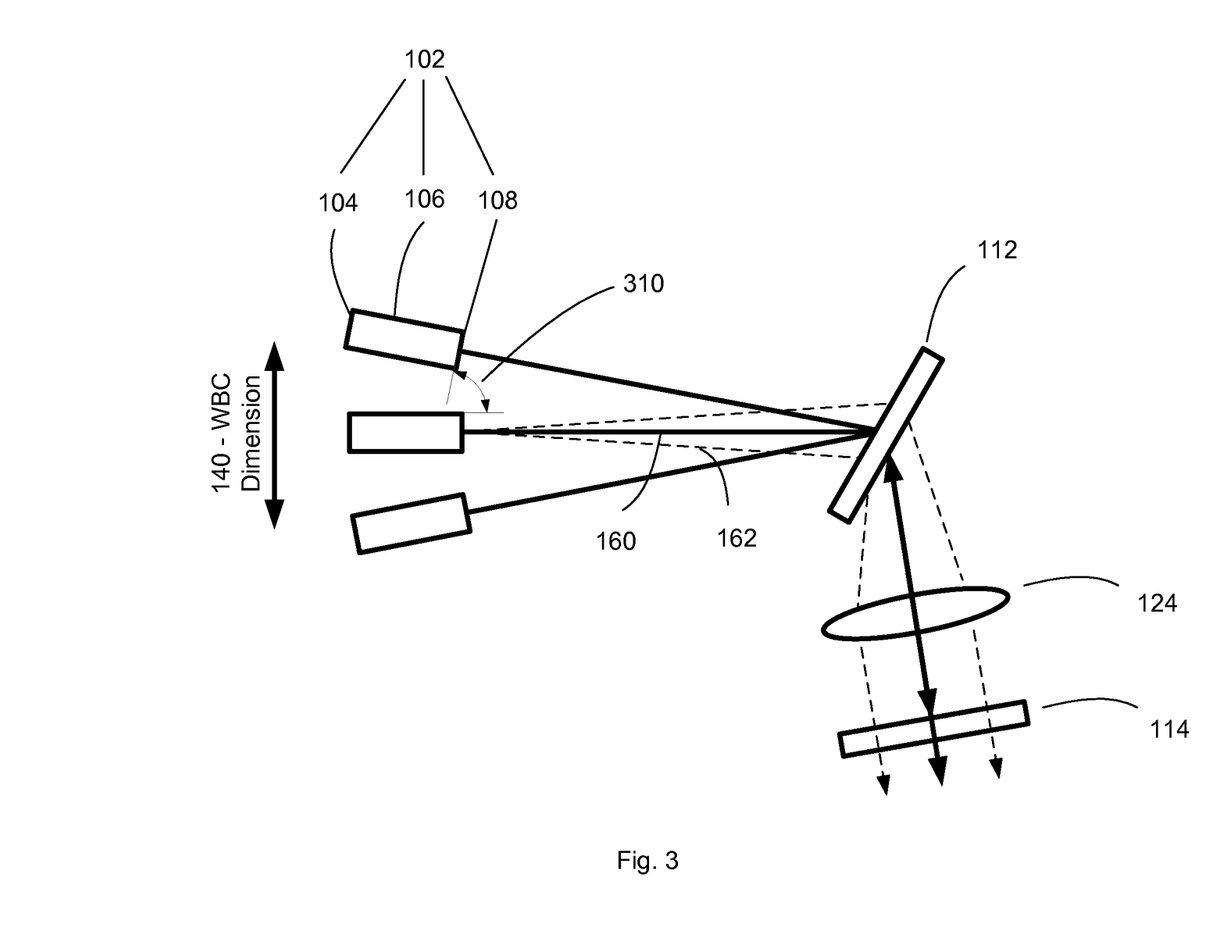
FIG. 3 illustrates a position-to-angle WBC system devoid of an optical combining element.

Other embodiments described herein also reduce system size and even the need for an optical combining element(s) through using alternative position-to-angle methods. For example, FIG. 3 illustrates a WBC system devoid of an optical combining element. Each diode bar 102 (in some cases may be comprised of only a single diode emitter) may be mechanically positioned in a manner that the chief rays (solid lines 160) exiting the diode bars 102 overlap at a common region on the dispersive element 112 as shown. (In other variations of this embodiment, and similar to FIG. 2B, the beams do not completely overlap at the dispersive element, but the spatial distance between each along a combining dimension is reduced.) The diverging rays, illustrated by dashed lines 162, are later collimated by collimating optic(s) 124 positioned between the dispersive element 112 and the partially reflective output coupler 114. (Some variations of this embodiment include replacing collimating optic 124 with individual FAC and/or SAC lenses positioned at the front surface or facet of each diode bar) This embodiment thus increases brightness while reducing the number of optical elements required as well as reducing overall system size.

Figure 4:
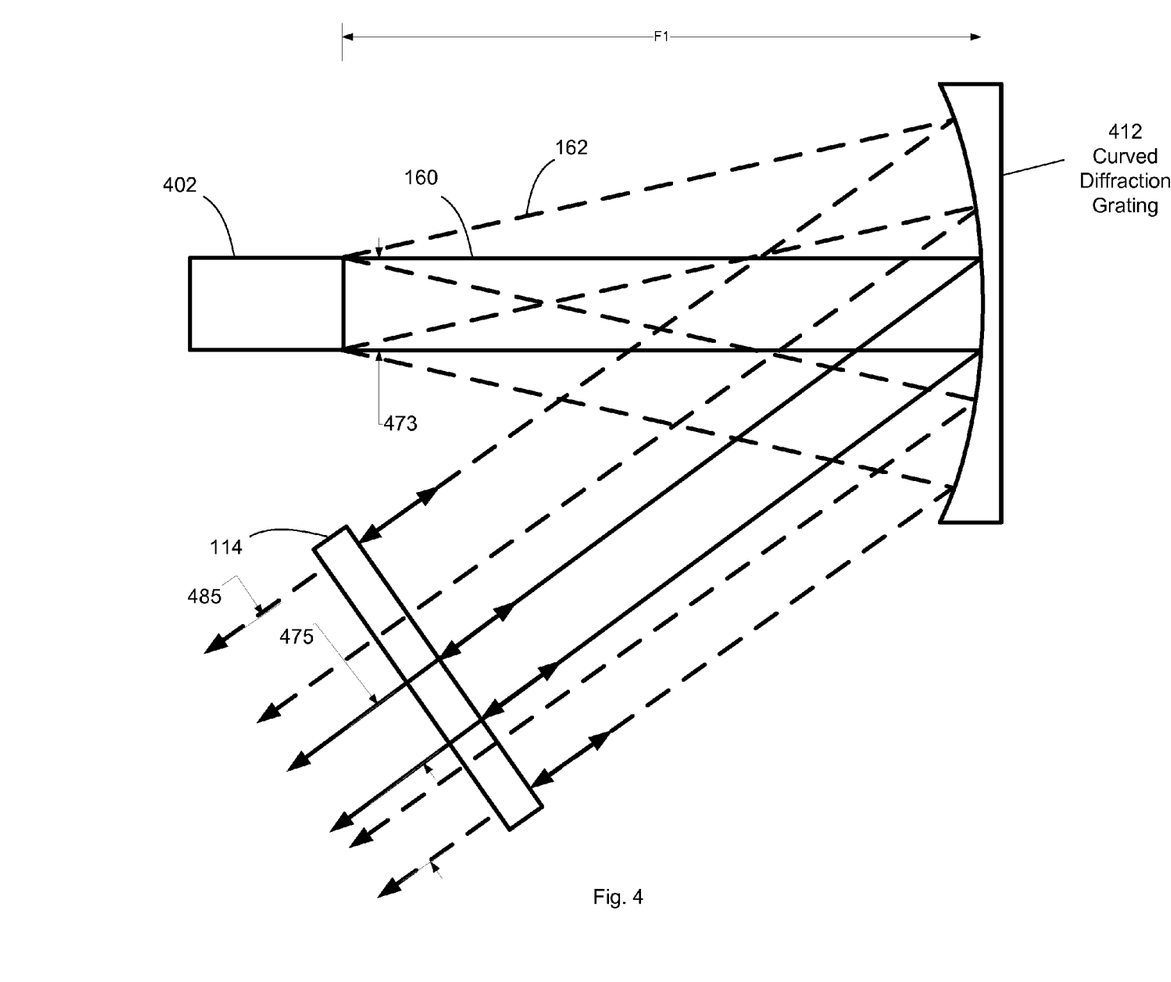
FIG. 4 illustrate a WBC laser system using a curved grating to increase brightness.

In another embodiment shown in FIG. 4, a curved diffraction grating 412 is placed a focal length F1 from the diode bar 102. The curved diffraction grating combines the emitted beams into a multi-wavelength beam that is transmitted to the partially-reflective output coupler 114 where a portion is reflected back towards the curved diffraction grating 412. The wavelengths of the reflected beams are then filtered by the diffraction grating and transmitted back into each emitter of diode bar 102, wherein each emitter is stabilized to a particular wavelength. The limitation of brightness in this type of system generally hinges on the amount of power the curved diffraction grating can handle. This embodiment illustrates an optical architecture reducing the number of optical elements and shortening the beam path while increasing the brightness of a multi-wavelength output beam. The degradation of the beam quality results as a function of the width 475 over the entire distance of the beam profile 485.

Spatial Combiners

Figure 5A:
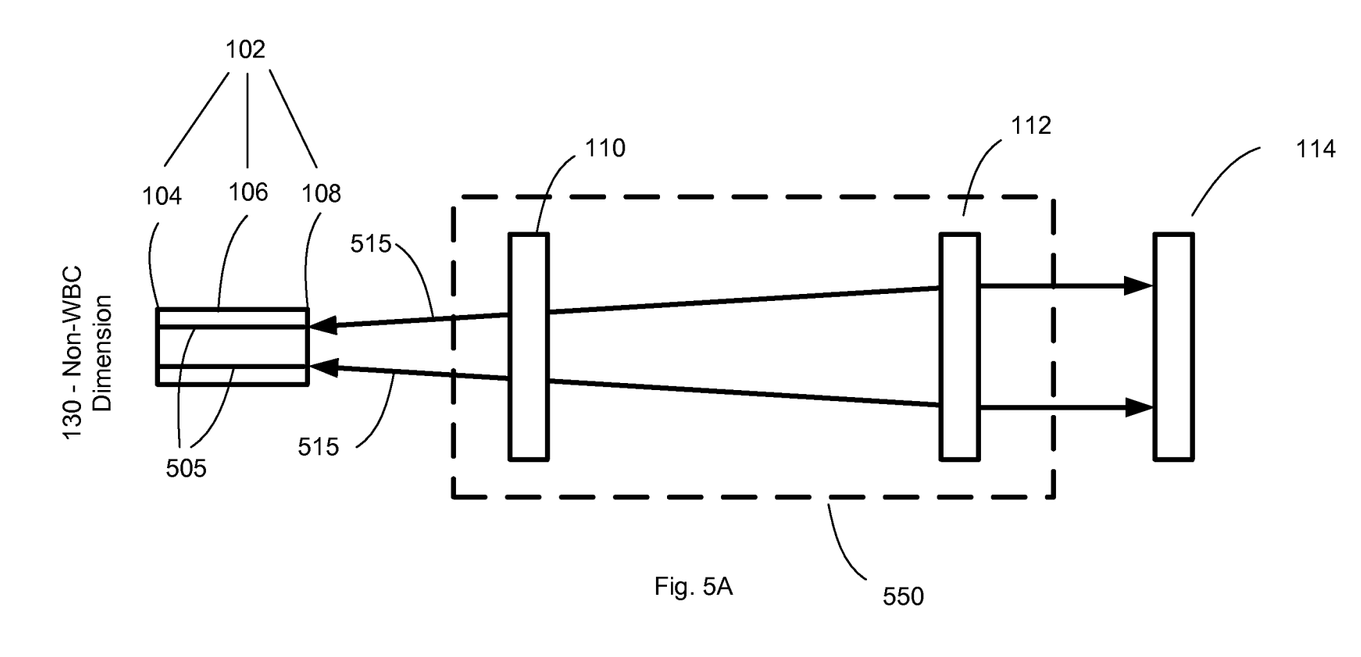
FIGS. 5A-C illustrate WBC systems incorporating various spatial combining optical systems configured to substantially overlap wavelength feedback along the non beam combining dimension.
Figure 5B:
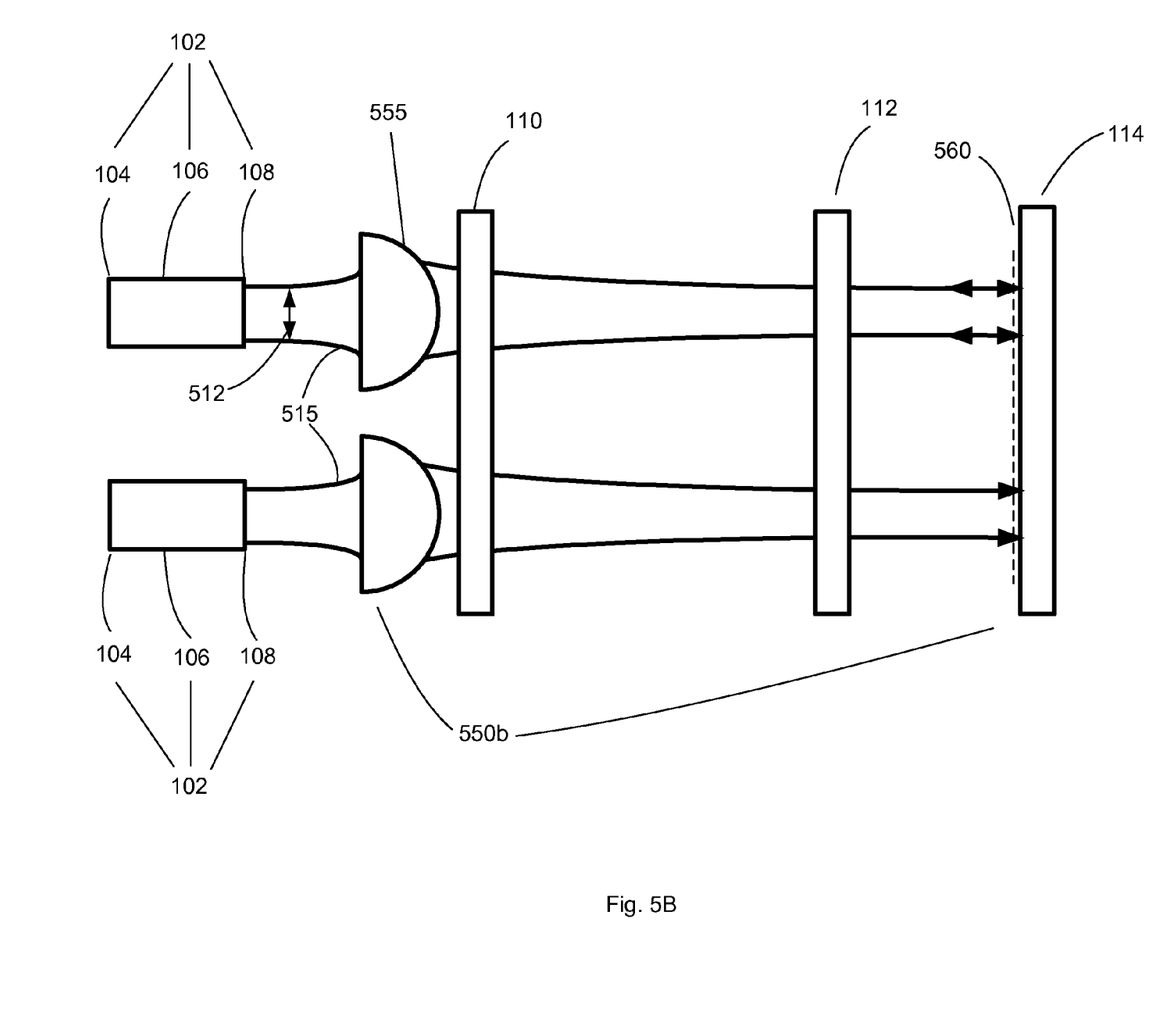
Figure 5C:
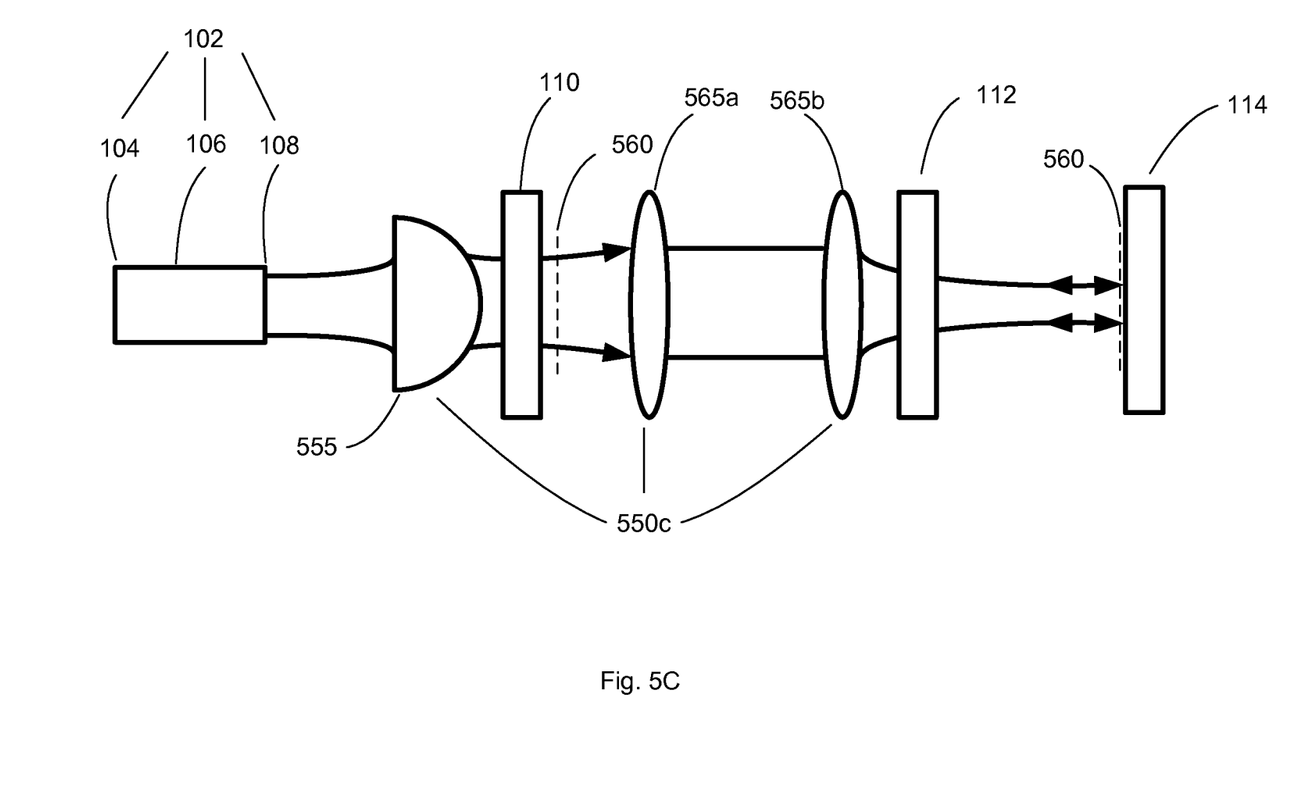
Figure 7A:
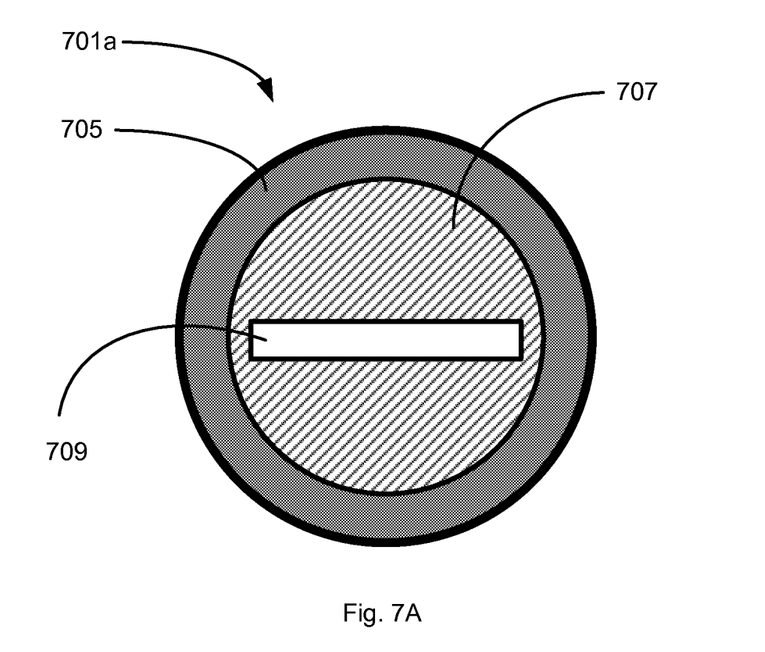
FIG. 7A-B illustrate the effect of spatial beam combining on fiber coupling.
Figure 7B:
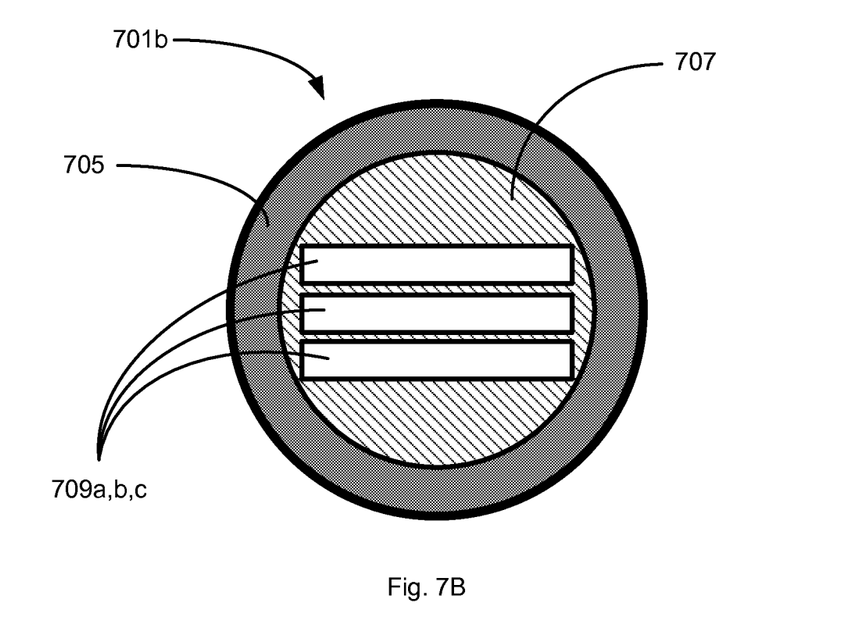

FIGS. 5A-C illustrate various embodiments of spatial combiners incorporated along the non-beam combining dimension of a WBC system that help to increase system output power that may be coupled into a fiber as illustrated in FIGS. 7A-B. FIG. 5A illustrates a simple black box model, showing a spatial combiner 550 that may be configured in various ways. The key concepts are to overlap feedback for each beam along its original pathway along the non-combining dimension to be received back into each of the original emission points or emitters. The feedback is often the result of the partially-reflective output coupler 114, which reflects a portion of the multi-wavelength beams. For example two optical pathways 515 as shown in FIG. 5A, illustrate pathways where beams or multiple beams of radiation travel through the spatial combiner 550, which helps to overlap the radiation reflected by output coupler 114, back into the emitters 505, thus forming a stabilized system.

FIG. 5B illustrates one embodiment of a system utilizing a spatial combiner wherein multiple lenses 555 image the beam waist of each emitter (array of emitters) from each diode bar 102 onto or near the partially-reflective output coupler 114. This helps the two-dimensional array of emitters (here shown as two diode bars having at least one emitter each) from diverging too quickly, properly guiding feedback into the original emitters, thus stabilizing each emitter along the non-beam combining dimension and allowing the multi-wavelength output to be in a compact form. FIG. 5C illustrates an embodiment having a spatial combiner 550c that uses a lens 555 and an afocal telescoping system (565a-b) to keep the reflected beams overlapping the original pathways and thus stabilizing each of the emitters.

FIGS. 7A-B illustrate the effect of spatial beam combining on fiber coupling. As shown in FIG. 7A optical fiber 701a has a cladding 705 and core 707 configured to receive a multi-wavelength beam 709. Multi-wavelength beam 709 is usually formed by combining single row (1 dimension) of diode emitters (often generated by a single diode bar) into the size of a single element configured to be received by the core 707. However, in two-dimensional or multi-row/array diode emitters configurations (comprised of in some instances multiple diode bars) a spatial combiner, such as those described in FIGS. 5A-C is used to configure a multi-wavelength beam profile that has the size of three original elements/emitters stacked in a single column three into a similar sized core 707 of an optical fiber 701b. For example, one bar may be comprised of 49 emitters that are reduced to approximately the size of one emitter. By stacking or arranging optically or mechanically three bars with 49 emitters each a profile 709a, b,c (709a, b and c each representing a row or diode bar) may be produce a multi-wavelength beam profiled configured to be received into an optical fiber that increases the brightness and power by a factor of 3 times.

Adjustable BPP

As described above, various spacing between the diode emitters, combining optical element and dispersive element have been discussed (including those systems devoid of an optical combining element). Also disclosed in FIG. 6 was a graph illustrating the normalized beam quality measured in terms of beam parameter product (BPP). The BPP of each system described herein, may adjusted from a low BPP to a higher BPP. In laser manufacturing, cutting, and welding, various materials, thickness, type of cut and so forth require a laser to have a flexible output based on BPP. Some materials require the highest quality beam output (or lowest BPP available) to cut; however, in other circumstances where the parameters of the material, cut, thickness have been altered the same high quality is insufficient to efficiently performed the desired task. Thus, the WBC system would be intentionally adjusted to reduce beam quality in order to more effectively accomplish a particular manufacturing task. Therefore, in the scope of the application, adjustable positioning of diode emitters with respect to the dispersive element, diode emitters with respect to the combining optical element, combining optical element with respect to the dispersive element, help to create a flexible WBC laser system to accomplish a greater range of tasks. These adjustable position configurations may include manual and real-time adjustments. E.g. thin metal applications and thick metal applications as well as the type of metal to be cut sometimes require different cutting parameters relative to beam quality. In another embodiment, in addition to linearly positioning the beams and elements along the beam combining dimension, the angular position of at least one of the beams is repositionable. This repositioning may be automated that it may occur in real time. One way of accomplishing this by placing a rotatable optical element, such as a piece of glass after the multi-wavelength output of the WBC system and prior to a fiber optical mount (FOM).

Figure 8A:
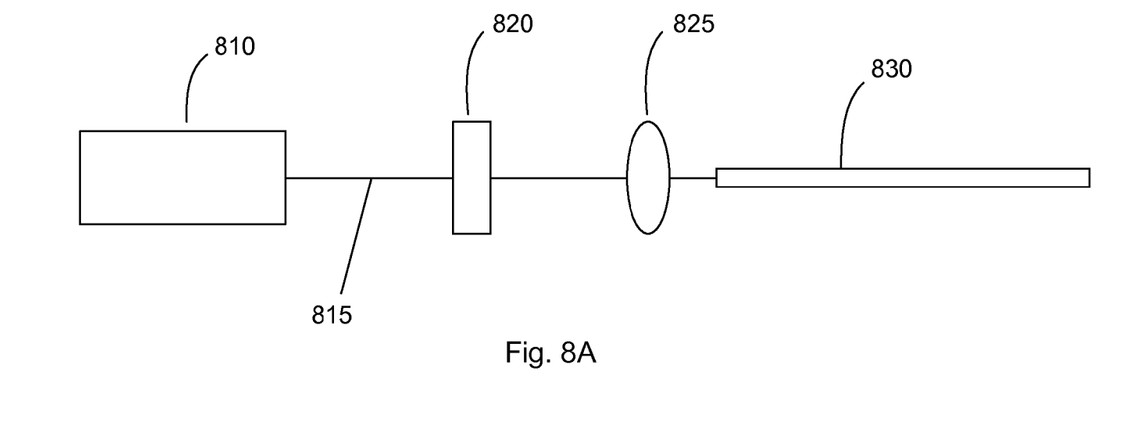
FIGS. 8A-B illustrate an optical schematic of a variable/tunable brightness output WBC system coupled to a fiber.
Figure 8B:
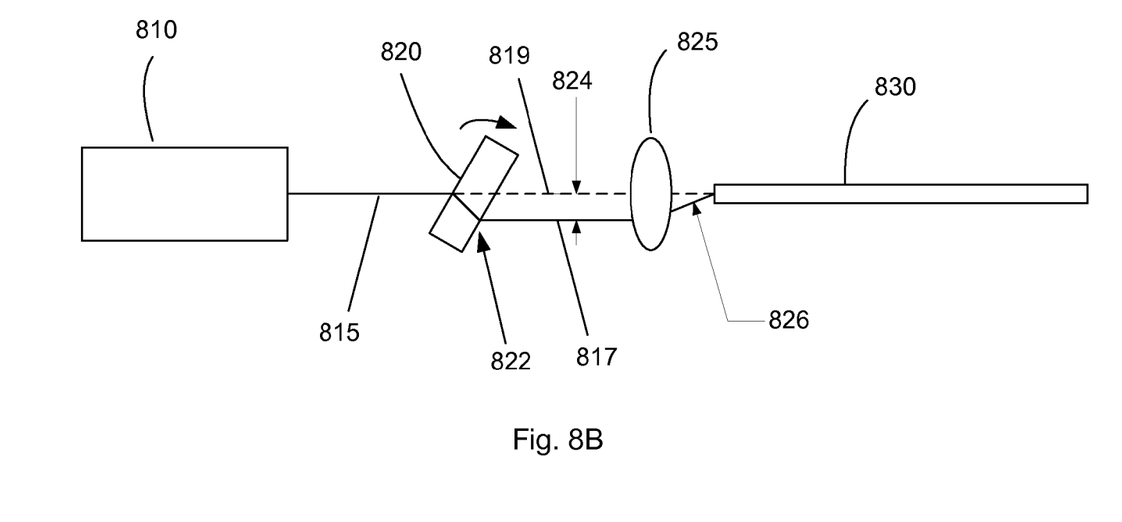

FIGS. 8A-B illustrate an embodiment incorporating a rotatable optical element 820 (or beam path adjuster) in the optical pathway 815 containing the multi-wavelength output beam from WBC system 810 to a FOM 825 configured to direct the multi-wavelength beam into fiber 830 with its associated NA and width. FIG. 8A illustrates the configuration where the rotatable optical element 820 has a surface normal to the optical pathway 815, thus allowing the optical pathway to continue on to the FOM 825 with no or minimal interference. Alternatively, rotatable optical element 820 can be positioned where the surface is offset at a non-normal angle causing the multi-wavelength beam to be redirected at 822 following a new optical path 817 that is offset by a distance 824 from the unaltered optical pathway 819. This causes the angle 826 at which the multi-wavelength beam enters fiber 830 from FOM 825 to increase. This increase in angle reduces the quality of the multi-wavelength beam. As stated, in some instances a less bright beam is actually more desirable for particular applications, thus having a tunable or adjustable WBC system may be configured to accomplish various tasks at optimal settings for those particular tasks. In some embodiments the rotatable optical element 820 may is manually adjusted while in others the rotation process may be automated.

In yet other configurations wherein the output beam quality of the system is adjustable, the output power of each emitter may adjusted from completely off to full power output.

The above description is merely illustrative. Having thus described several aspects of at least one embodiment of this invention including the preferred embodiments, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A multi-wavelength beam combining laser system for combining a plurality of beams along a beam combining dimension into a multi-wavelength beam comprising optical radiation having a plurality of wavelengths, the laser system comprising:
    a plurality of beam emitters each emitting a beam, each beam including a chief ray;
    a combining optical element arranged to receive the plurality of beams, and cause the chief ray of each beam to converge along the beam combining dimension, wherein the combining optical element has a focal length;
    a dispersive element, positioned along the beam combining dimension, to (i) receive the plurality of converging chief rays, (ii) disperse the chief rays along the beam combining dimension, and (iii) transmit the plurality of dispersed chief rays, the dispersed chief rays constituting a plurality of transmitted beams; and
    a partially reflective output coupler arranged to receive the transmitted beams from the dispersive element, to reflect a portion of the transmitted beams toward the dispersive element, and to transmit the multi-wavelength beam,
    wherein (i) the combining optical element is disposed at a first optical distance, traversed by the beams, away from the plurality of beam emitters, (ii) the combining optical element is disposed at a second optical distance, traversed by the beams, away from the dispersive element, and (iii) one of the first or second optical distances is less than the focal length.

2. The multi-wavelength beam combining laser system of claim 1, further including a multi-wavelength beam path adjuster positioned after the output coupler and configured to modify the entrance angle of the multi-wavelength beam into an optical fiber.

3. The laser system of claim 1, wherein the combining optical element is repositionable with respect to the dispersive element, and wherein the repositioning results in a change of the beam quality output of the multi-wavelength beam transmitted by the output coupler.

4. The laser system of claim 3, wherein repositioning is automated and may occur in real time.

5. The laser system of claim 1, further including a spatial combiner system positioned along a non-beam combining dimension and configured to provide feedback to each beam emitter from the partially-reflective output coupler along the non-beam combining dimension.

6. The laser system of claim 1, further including a beam path adjuster positioned after the output coupler that is configured to modify the entrance angle of the multi-wavelength beam into an optical fiber.

7. The beam path adjuster of claim 6, wherein the beam path adjuster is automatically repositionable.

8. The laser system of claim 6, further including a focusing element positioned after the beam path adjuster configured to work with the beam path adjuster to modify the entrance angle of the multi-wavelength beam in an optical fiber.

9. The multi-wavelength beam combining laser system of claim 1, wherein:
    the first optical distance is less than the focal length,
    each beam emitted by the plurality of beam emitters comprises one or more diverging rays,
    the combining optical element does not cause diverging rays to converge along the beam combining dimension,
    the dispersed chief rays overlap each other spatially at the dispersive element,
    the dispersive element (i) receives diverging rays, (ii) disperses the received diverging rays, and (iii) transmits the dispersed diverging rays, and
    the dispersed diverging rays do not completely overlap spatially with the dispersed chief rays at the dispersive element.

10. The multi-wavelength beam combining laser system of claim 9, further comprising, disposed between the dispersive element and the output coupler, collimating optics for collimating the dispersed diverging rays transmitted by the dispersive element.

11. The multi-wavelength beam combining laser system of claim 9, wherein the second optical distance is substantially equal to the focal length.

12. The multi-wavelength beam combining laser system of claim 9, further comprising a second combining optical element (i) disposed between the combining optical element and the dispersive element, and (ii) having a second focal length, wherein:
    the second combining optical element is disposed at a third optical distance, traversed by the beams, away from the plurality of beam emitters, the third optical distance being substantially equal to the second focal length,
    the second combining optical element is disposed at a fourth optical distance, traversed by the beams, away from the dispersive element, the fourth optical distance being less than the second focal length,
    the second combining optical element collimates, along the beam combining dimension, diverging rays received by the dispersive element.

13. The multi-wavelength beam combining laser system of claim 1, wherein:
    the second optical distance is less than the focal length, and
    the dispersed chief rays do not completely overlap each other spatially at the dispersive element,
    whereby a beam quality of the multi-wavelength beam is degraded as a function of the second distance.

14. The multi-wavelength beam combining laser system of claim 13, wherein the first optical distance is substantially equal to the focal length.

15. A multi-wavelength beam combining laser system comprising:
- a plurality of beam emitters each emitting a beam,
- a curved dispersive element having a concave exterior surface, the concave exterior surface being positioned to receive each emitted beam, disperse the received beams along a beam combining dimension, and transmit the dispersed beams from the concave exterior surface; and
- a partially reflective output coupler arranged to receive the transmitted dispersed beams from the concave exterior surface of the curved dispersive element, to reflect a portion of the transmitted dispersed beams back toward the concave exterior surface of the curved dispersive element, and to transmit, through the partially reflective output coupler, a multi-wavelength beam comprising optical radiation having a plurality of wavelengths.

16. The multi-wavelength beam combining laser system of claim 15, wherein the curved dispersive element has a focal length, and an optical distance, traversed by the beams, between the plurality of beam emitters and the concave exterior surface of the curved dispersive element is substantially equal to the focal length.

17. The multi-wavelength beam combining laser system of claim 15, wherein no focusing optics or lenses are disposed within an optical path between the plurality of beam emitters and the curved dispersive element.

18. The multi-wavelength beam combining laser system of claim 15, wherein the curved dispersive element transmits the multi-wavelength beam from the concave exterior surface without transmission through the curved dispersive element.

19. A method of forming a multi-wavelength beam combining laser system comprising the steps of:
- overlapping a plurality of beams emitted by a plurality of beam emitters onto a dispersive element along a beam combining dimension by mechanically angling each individual beam emitter with respect to the others such that corresponding chief rays of the beam emitters are emitted from the beam emitters non-parallel to each other and converge onto a common point upon a surface of the dispersive element without an intervening combining lens between the beam emitters and the dispersive element; and
- transmitting the overlapped beams to a partially-reflective output coupler, wherein a portion of the beams are reflected back towards the dispersive element and wherein the output coupler transmits a multi-wavelength beam.

20. The method of claim 19, further including the step of individually collimating the beams after transmitting the overlapped beams to the partially-reflective output coupler.

21. The method of claim 19, further including the step of individually collimating each transmitted beam prior to overlapping each beam onto the dispersive element.

22. The method of claim 19, further including the step of spatially combining beams along a non-beam combining dimension configured to be received into an optical fiber.

23. The method of claim 19, further comprising:
- transmitting divergent beams to the dispersive element along the beam combining dimension;
- thereafter, collimating the divergent beams; and
- thereafter, transmitting the collimated divergent beams to the partially-reflective output coupler.

* * * * *